United States Patent [19]

Westerberg

[11] 3,903,536

[45] Sept. 2, 1975

[54] DEVICE FOR GENERATING MASKS FOR MICROCIRCUITS

[76] Inventor: Gerhard Westerberg, Hastskovagen 7A, 183 50 Taby, Sweden

[22] Filed: Nov. 19, 1973

[21] Appl. No.: 416,885

[52] U.S. Cl. ........................ 354/4; 354/124; 355/53

[51] Int. Cl.$^2$ ........................................ G03B 27/12

[58] Field of Search .................. 354/4, 124; 355/53

[56] References Cited

UNITED STATES PATENTS

| | | | |
|---|---|---|---|
| 1,857,706 | 5/1932 | Zabrocki | 354/124 |
| 1,900,566 | 3/1933 | Kanolt | 354/124 |
| 2,259,084 | 10/1941 | Rosenhaft | 354/123 |
| 2,459,552 | 1/1949 | Stoner | 355/53 |
| 3,354,806 | 11/1967 | Lang | 355/41 |

*Primary Examiner*—John M. Horan

*Attorney, Agent, or Firm*—Silverman & Cass, Ltd.

[57] ABSTRACT

This invention relates to a device for generating masks for microcircuits. The device is of the kind comprising a radiation source, a radiation responsive medium and means for producing relative movement between the radiation source and the medium.

5 Claims, 8 Drawing Figures

DEVICE FOR GENERATING MASKS FOR MICROCIRCUITS

BACKGROUND OF THE INVENTION

To produce photo masks on a scale 1:1 for contact printing of patterns for microcircuits is at present a complicated and tedious process, which involves a plurality of intermediate steps from the original image to the final product. This applies also to the use of a computer-controlled "mask composition camera", because the final mask is not obtained directly, but first after reduction and repeated exposure ("step and repeat") for covering the desired area. The necessary time for this process is 3 to 16 hours, depending on the complexity of the pattern.

The development of the laser technology has opened new possibilities for a rapid exposure of masks for microcircuits. By using this technology, masks have been generated heretofore on a scale 10:1 by means of rotary mirror scanning and a computer-controlled light ray. In those cases when a resolution of 5 to 10 $\mu$m is deemed satisfactory and a flexible film is acceptable, masks for e.g. printed circuits may be generated in a relatively simple manner by positioning the film on a rotating drum, which is scanned by a light spot moving along the generatrix. This method, however, is not applicable in the generation of micro-masks on the scale 1:1 where a line width of 1 to 2 $\mu$m and good shape stability are required. The object of this invention is to provide a device, by which the said requirement can be satisfied.

It was found that at linear sweeps with a microscope objective caused to move at a rate of 25 c/s (50 sweeps per second) in the x-direction on a constant level above a photographic plate, at the same time as the latter is displaced at a lower speed in the y-direction, a "TV-raster" with a pitch line of 1 $\mu$m over an area of 7 × 7 $cm^2$ can be established in about 25 minutes. Such direct generation of a micro-circuit pattern (mask) without any intermediate reductions and repeated exposures, of course, is highly attractive and the more so as it can be realized at reasonable costs.

Figures 1, 2, 3, 8:
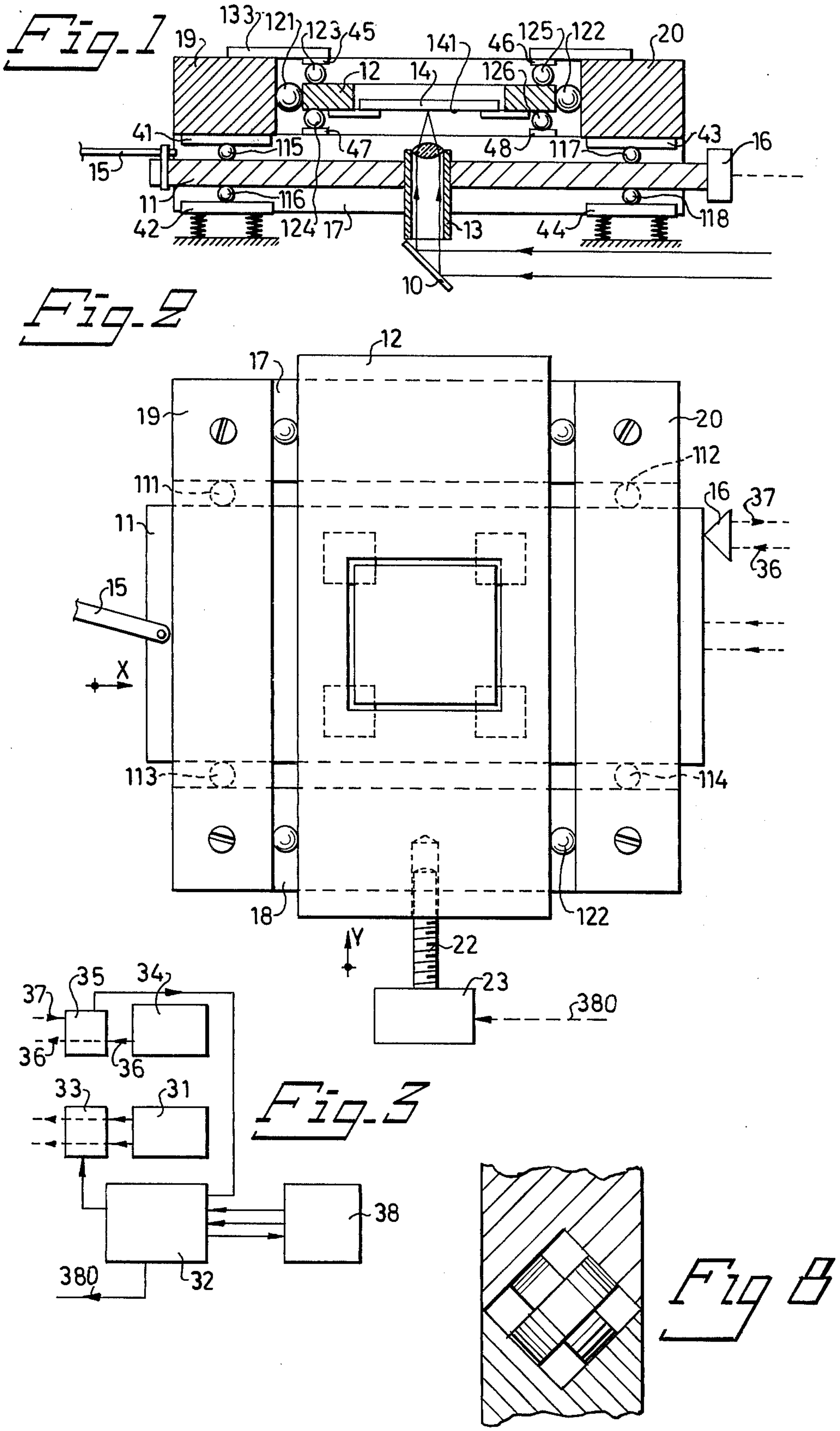
Figure 4:
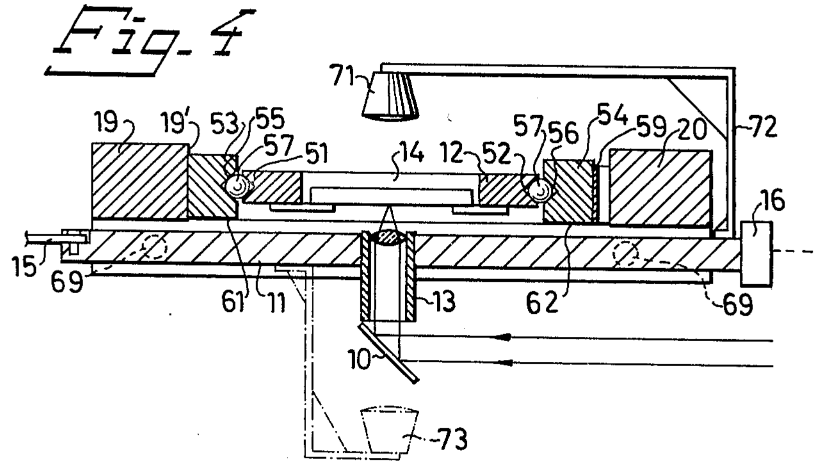
Figures 5, 6, 7:
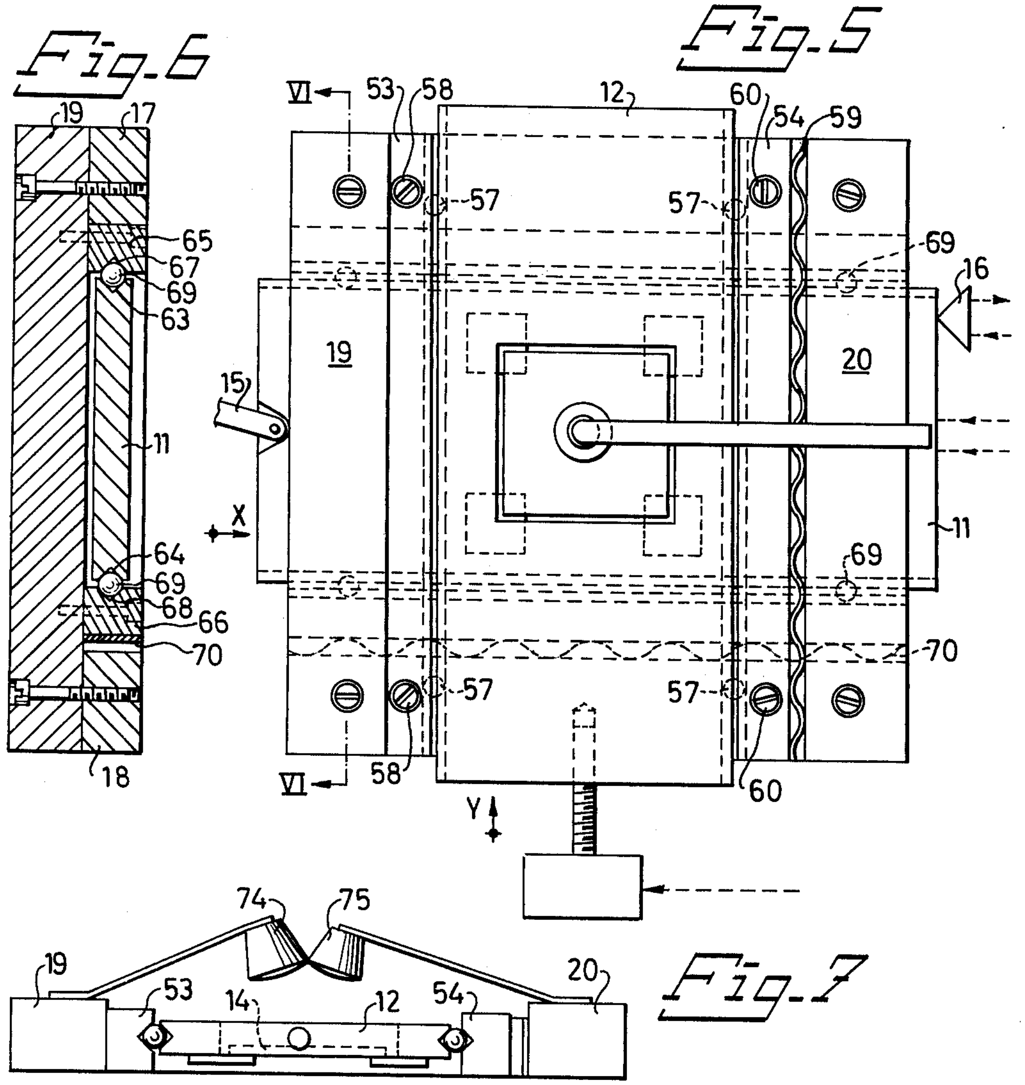

The invention is described in the following in greater detail, with reference to the accompanying drawings, in which FIG. 1 shows in a schematic manner and partly in section a side view of a beam structure with an optic system and a radiation responsive medium, FIG. 2 shows the device shown in FIG. 1 seen from above (some details, however, are for reasons of clearness omitted), FIG. 3 shows a block diagram on apparatus for driving the device according to FIGS. 1 and 2, FIG. 4 shows a vertical section of a modified device according to the invention, FIG. 5 shows the device as seen from above in FIG. 4, FIG. 6 shows a section at the line VI—VI in FIG. 5, and FIG. 7 shows a fragmentary side view of the device with a further modification.

FIG. 8 illustrates a device using roller bearings in V-grooves.

The device according to FIGS. 1 and 2 comprises a slide 11 adapted for relatively rapid movement in the x-direction, a slide 12 adapted for relatively slow movement in the y-direction, a lens mounting 13 provided in the slide 11 with an objective for focusing an incident laser ray, a glass plate 14 coated with a photo sensitive layer 141 and disposed in an opening in the slide 12, a crank shaft 15 driven by a motor (not shown) and driving the slide 11 in the x-direction, a screw 22 driven by a step motor 23 and driving the slide 12 in the y-direction, and a mirror 16 (prism) rigidly connected to the slide 11 and included in a laser interferometer for determining the position of the slide 11 in the x-direction.

For guiding the slides 11, 12 mechanically, a beam structure is provided which is assembled of four beams, two of which, 17 and 18, are parallell to each other and have carefully surface-ground side surfaces for guiding the slide 11 whereas the remaining two beams, 19 and 20, are parallell to each other and have carefully surface-ground side surfaces for guiding the slide 12. Between the slides and the side surfaces of the beams, sliding members in the form of balls 121, 122, 111, 112, 113 and 114 are provided. The slide 11, furthermore, contacts with pressure via sliding members 115, 116, 117, 118 and gage blocks 41, 42, 43 and 44 the lower surfaces of the beams 19 and 20, while the slide 12 contacts with pressure via sliding members 123, 124, 125, 126 and gage blocks 45, 46, 47, 48 the upper surfaces of the beams 17 and 18. Gage blocks 45, 46 could be excluded.

A ray from a laser 31 (see FIG. 3) is thrown by a mirror 10 onto the objective, which focuses the ray into a point on the photo layer. The focused laser ray consequently traces a line raster over the photo layer when the slide 11 is reciprocated at the same time as the slide 12 is moved in small steps. The slide 12 may e.g. be displaced 1 $\mu$m for each time the slide 11 has performed a complete reciprocation cycle. From a control electronic unit 32 modulation signals are obtained which via a modulator 33 expose a desired pattern into the plate 14. The requirements on the determination of position for different parts of the pattern are very high, which determination in the y-direction is accomplished by counting in the control electronic unit 32 control pulses, which at 380 are supplied to the step motor 23 for driving the screw 22. In the x-direction, a special measuring system is required in view of the rapid movement of the slide 11, which system comprises a laser interferometer with a laser 34, the mirror rigidly connected with the slide 11, and a stationary optic unit 35, in which interference signals between the direct laser ray 36 and the ray reflected from the mirror are formed and detected. These signals are fed to a counter in the control electronic unit 32 whereby highly accurate values of the position of the slide 11 in the x-direction are obtained. By means of the described control and measuring systems, viz. a step motor controlled micrometer screw in the y-direction and a laser interferometer in the x-direction, the control electronic unit 32 is capable to execute the exposure orders in accurately correct time and space positions. Current pattern programs emanate from a computer 38, which steps out the current information to the control electronic unit 32 for exposure within each separate line in the raster. The line information is maintained in a shift register within the control electronic unit 32, which register holds the same number of bits as there are points along a line, and is cycled in steps synchronously with the movement in the x-direction by means of shift pulses produced by the inferference signals.

With the system described above, it is possible to ensure a mutual correspondence between patterns produced at different times, and to maintain focus over the entire area so that different details are reproduced with the same sharpness. As already mentioned, the reproduction capacity is obtained by the slides being ball-guided laterally. Furthermore, the beam 20 is spring-biased towards the slide 12 so as to eliminate lateral play, and the beam 18 is spring-biased towards the slide 11 for the same reasons. The beams are accurately surface-ground on the sides contacting opposite beams, and they are joined to form a quadrangle by screw connections at the ends of the beams. This beam structure renders it possible to utilize a simple method for obtaining a constant focal distance between the objective and the photo layer all over the area. Without this method a very careful machining would have been required, among other steps, in order to define different levels for the two slides. The contact surfaces in the beam structure form highly accurately defined planes, with two reference surfaces facing downwards and two reference surfaces facing upwards. Due to the fact that the slide 12 with precision balls (e.g. 124, 125) is rolling on the upwardly facing reference surfaces, and the slide 11 is rolling on the downwardly facing reference surfaces, the vertical distance between the slides and, thereby, the maintenance of sharpness are determined accurately and independently of the positions of the slides in the x- and y-directions. The vertical distance can be adjusted by inserting adjusting blocks 41 and 47, on which the rolling takes place. The method of utilizing the common surface, which is formed by screwing the four beams against one another, as a roll track, possibly with intermediate adjusting blocks, for two movable slides brings about a substantial saving of manufacturing costs compared with similar conventional methods. The rolling against said reference surfaces also is free of play, as opposed ball paths are biased against the reference surfaces. See, for example, the bias plate 133 and the ball 123 for the left-hand portion of the slide 12. By a simple supplement to the device shown, it is easy to check a generated mask and compare it with the program forming the basis of the generation. The supplement comprises a light sensitive detector disposed in the normal direction of the focusing unit 13 on the other side of the slide 12. This detector should be attached to the slide 11 and consequently follow accurately the slide in its movements in the x-direction. By feeding a constant radiation from the laser 31, a modulated signal containing all information required about the mask is obtained from the detector, after the radiation has passed through the mask positioned where the unit 14-141 now is disposed in FIGS. 1 and 2. The checking, thus, is extremely rapid and reliable.

Obviously, a great number of modifications can be imagined within the scope of the invention idea. The slide 11, for example, may be driven by the step motor, and the slide 12 by the crank shaft-motor. Furthermore, the ball guide means may be replaced by other bearing guide means.

Position measurement by means of a laser interferometer can be extended to include also the slower slide. In such a case, a screw drive by a step motor is not required any longer, but the screw can be driven by a more simple motor controlled by position information from the laser interferometer. At a further embodiment, the laser interferometer for indicating the position of the fast slide may be replaced by a clock signal written into a magnetic layer on the slide and readable by a stationary head directly adjacent the magnetic layer.

The surface exposed per time unit, moreover, may be increased by distributing the exposing ray to a plurality of focusing units attached to the slide 11, each of which units scans a partial section of the mask. Alternatively, this device may be used for a simultaneous exposure of a plurality of different masks.

The device according to FIGS. 4–6 is of the same basic construction as the device according to FIGS. 1 and 2, and therefore only the construction which differs from the device according to FIGS. 1 and 2 will substantially be described below, i.e. the construction for supporting the slides. This supporting is carried out by means of V-grooves and balls in the way that, as is shown in FIG. 4, the side surfaces of the slide 12, which surfaces extend in the movement direction of said slide, are provided with a V-groove 51, 52 each, and that supporting ribs 53, 54, which are located in parallell with said slide surfaces, are provided with a V-groove 55, 56 each, and that precision balls 57 are located in the V-grooves 51, 55 and 52, 56 respectively. A system of roller bearings in V-grooves is shown in principle in FIG. 8.

The supporting rib 53 is adapted to fit against a reference surface 19: of the firmly secured beam 19 and is removably arranged by screws 58. The supporting rib 53 therefore serves as a precision guide, which can be exchanged when it has become worn out.

The supporting rib 54 abuts a leaf spring 59, which is wave shaped in the longitudinal direction, and which is abutting the firmly secured beam 20. Screws 60 for the removable securing of the supporting rib 54 have such a clearance in the screw holes of the rib, that the supporting rib 54 is displaceable to some small extent towards the slide 12 by the influence of said leaf spring 59, and thereby the V-grooves and the balls will engage each other well so that the slide will be safely supported. The initial adjustment of the slide 12 is carried out from the reference surface 19:.

The supporting ribs 53, 54 are suitably vertically adjustable by precision spacers 61, 62. FIG. 5 shows the supporting ribs 53, 54 extending along the whole length of the beams 19, 20, but each of them may consist of two shorter pieces arranged at the location of the balls.

The slide 11 is supported by the same kind of device as for the slide 12. As is shown in FIG. 6 the slide 11 is provided with V-grooves 63, 64 on the side surfaces, which extend in the movement direction of the slide, and supporting ribs 65, 66 in parallel with said slide side surfaces are provided with corresponding V-grooves 67, 68, and between the grooves balls 69 are located. The beam 17 hereby has a reference surface for the supporting rib 65 and thereby for the slide 11, whereas the supporting rib 66 abuts a leaf spring 70.

The described construction has the advantage that only eight balls are required for the supporting and guiding of the two slides, whereas 24 balls are required in the device according to FIGS. 1 and 2.

The supporting ribs 55 and 65 respectively which are abutting a reference surface may be excluded, the V-groove being located directly in the beam 19, 17 respectively, but the use of supporting ribs has the advantage that they can be exchanged when they are worn out.

According to FIG. 4 a photo detector 71 is provided above the slide 12 with its glass plate 14 and secured on the slide 11 by an arm 72 and following the slide in its movements. The intention of the detector arrangement is already described in the description of the device according to FIGS. 1 and 2.

By a reflecting workpiece of metal as an object in the slide 12 a part of the ray is reflected back through the focusing device 13 and further through the mirror 10, if this is semi-transparent. The detector 71 can then be excluded and instead a detector 73 may be provided under the mirror 10, as is shown in dash-and-dot lines in FIG. 4.

A still further way of arranging photo detectors is shown in FIG. 7. Here two photo detectors 74, 75 are provided above the slide 12 and secured to the fixed beams 19 and 20, but they can be secured to any fixed part. This construction is possible due to the facts, that the ray reaching the detectors 74, 75 has diverged and that the detectors do not have such a narrow catching area, that it is necessary to let them follow the slide movements. It is also possible to arrange several detectors in a line along the movement path of the focusing device 13.

Different modifications of the invention may be made within the scope of the appended claims. Thus, for example, each of the balls 57, 69 may be replaced by two rollers which are located after each other and with their axes of rotation perpendicular to each other in a manner known per se.

What I claim is:

1. A device for generating masks for microcircuits, comprising

A. means for receiving a ray from a radiation source,

B. a medium graphically responsive to radiation,

C. means for producing a relative movement between the radiation source and the medium, said means including a first and a second slide, D. means associated with the first slide enabling rapid reciprocating movement thereof in a first direction, E. means associated with the second slide enabling slow movement in a second direction and simultaneously with said reciprocating movement, F. focusing means connected to the first slide for focusing radiation energy received from a radiation source, G. fixture means connected to the second slide for fastening the radiation responsive medium to the slide, and H. a beam structure including four beams for mechanical guidance of the first slide and the second slide, the first two beams being parallel to one another having surface-ground side surfaces for guiding the first slide by means of sliding members between said side surfaces and the side surfaces of the first slide, the second two beams being parallel to one another and having surface-ground side surfaces for guiding the second slide by means of sliding members between the last-mentioned side surfaces and the side surfaces of said second slide, said first two beams being adapted to contact with their upper surfaces the lower surfaces of the second two beams, whereby said upper surfaces and lower surfaces of the beams form a common reference plane for the two slides, the first slide contacting the lower surfaces of said second two beams with pressure via sliding members while the second slide contacts the upper surfaces of the two first-mentioned beams with pressure via sliding members.

2. A device for generating masks for microcircuits, comprising

A. means for receiving a ray from a radiation source,

B. a medium graphically responsive to radiation,

C. means for producing a relative movement between the radiation source and the medium, said means including a first and a second slide, D. means associated with the first slide enabling rapid reciprocating movement thereof in a first direction, E. means associated with the second slide enabling slow movement in a second direction and simultaneously with said reciprocating movement, F. focusing means connected to the first slide for focusing radiation energy received from a radiation source, G. fixture means connected to the second slide for fastening the radiation responsive medium to the slide, and H. a beam construction for mechanical guidance of said first and second slide, said beam construction including two pairs of beams crossing one another, the beams in each pair being substantially parallel, their opposite side surfaces serving as a guide for each respective slide by sliding means between said side surfaces of the beams and the side surfaces of each respective slide, said sliding members comprising V-grooves which are arranged in said side surfaces of the beams as well as of the slides and which grooves are open opposite each other, and balls or rollers located in said grooves.

3. A device as set forth in claim 2, in which in each pair of beams one of said side surfaces forms a fixed reference surface and the second of said side surfaces forms a spring-pressure surface.

4. A device as set forth in claim 2, in which in each pair of beams the side surface of one of the beams, which surface is turned towards the slide, forms a fixed reference surface, and a first supporting rib abuts said reference surface and is provided with a V-groove open towards one V-groove of the slide, the other beam providing support for a second supporting rib by resilient means, said rib having a V-groove open towards the other V-groove of the slide, a plurality of balls or rollers being located in said V-grooves, so that the slide pressure is defined in position relative to said reference surface by influence of resilient pressure.

5. A device for generating masks for microcircuits, comprising

A. means for receiving a ray from a radiation source,

B. a medium graphically responsive to radiation,

C. means for producing a relative movement between the radiation source and the medium, said means including a first and a second slide, D. means associated with the first slide enabling rapid reciprocating movement thereof in a first direction, E. means associated with the second slide enabling slow movement in a second direction and simultaneously with said reciprocating movement, F. focusing means connected to the first slide for focusing radiation energy received from a radiation source, G. fixture means connected to the second slide for fastening the radiation responsive medium to the slide, and H. a semi-transparent mirror being arranged to direct the rays falling in on the mirror towards the objective of the focusing device, and a photodetector being disposed behind the mirror as seen from the focusing device and mechanically attached to said first-mentioned slide, so as to receive radiation energy reflected from said radiation responsive medium and penetrating said mirror.

* * * * *